United States Patent
Su et al.

(10) Patent No.: US 12,289,724 B2
(45) Date of Patent: Apr. 29, 2025

(54) SIDELINK CONTROL INFORMATION SENDING AND RECEIVING METHOD, TERMINAL APPARATUS, AND SYSTEM

(71) Applicant: Huawei Technologies Co., Ltd., Shenzhen (CN)

(72) Inventors: Hongjia Su, Shanghai (CN); Wenting Guo, Shanghai (CN); Zhengzheng Xiang, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 472 days.

(21) Appl. No.: 17/707,701

(22) Filed: Mar. 29, 2022

(65) Prior Publication Data
US 2022/0225316 A1 Jul. 14, 2022

Related U.S. Application Data

(63) Continuation of application No. PCT/CN2019/109208, filed on Sep. 29, 2019.

(51) Int. Cl.
H04W 72/20 (2023.01)
H04L 1/00 (2006.01)
H04W 4/40 (2018.01)

(52) U.S. Cl.
CPC ........... H04W 72/20 (2023.01); H04L 1/0061 (2013.01); H04W 4/40 (2018.02)

(58) Field of Classification Search
CPC ........ H04L 1/0061; H04W 72/20; H04W 4/40
(Continued)

(56) References Cited

U.S. PATENT DOCUMENTS

2020/0260472 A1* 8/2020 Ganesan .................. H04W 4/46
2021/0068101 A1* 3/2021 Chen ....................... H04L 1/0072
2022/0225292 A1* 7/2022 Mohammad Soleymani .............
H04W 84/005

FOREIGN PATENT DOCUMENTS

CN 106612561 A 5/2017
CN 109792370 A 5/2019
(Continued)

OTHER PUBLICATIONS

Spreadtrum Communications, "Discussion on physical layer structure for sidelink," 3GPP TSG RAN WG1 #97, Reno, USA, R1-1906361, total 15 pages, 3rd Generation Partnership Project, Valbonne, France (May 13-17, 2019).
(Continued)

Primary Examiner — Rownak Islam
(74) Attorney, Agent, or Firm — Leydig, Voit & Mayer, Ltd.

(57) ABSTRACT

A sidelink control information sending and receiving method, a terminal apparatus, and a system are provided in this application, and may be applied to fields such as vehicle-to-everything (for example, V2X, LTE-V, or V2V), intelligent driving, and an intelligent connected vehicle. In a scenario in which second-stage SCI is not required in a sidelink communication system, a transmit end apparatus in sidelink communication indicates, by using first-stage SCI, a cyclic redundancy check bit corresponding to the first-stage SCI, or a reference signal used to demodulate the first-stage SCI, that the transmit end apparatus is not to send the second-stage SCI to a receive end apparatus. In this way, the transmit end apparatus may flexibly choose, based on a specific scenario of the sidelink communication, to use 2-stage SCI or 1-stage SCI, to avoid resource waste caused by using the 2-stage SCI in any scenario of the sidelink
(Continued)

communication, thereby improving resource utilization efficiency.

5 Claims, 6 Drawing Sheets

(58) Field of Classification Search
USPC .......................................................... 370/329
See application file for complete search history.

(56) References Cited

FOREIGN PATENT DOCUMENTS

| | | | |
|---|---|---|---|
| CN | 109905213 | A | 6/2019 |
| WO | 2018201679 | A1 | 11/2018 |
| WO | 2019128261 | A1 | 7/2019 |

OTHER PUBLICATIONS

Samsung, "Feature lead summary#2 for 7.2.4.1 Physical layer structure for sidelink," 3GPP TSG RAN WG1 #97 Meeting, Reno, USA, R1-1907755, total 26 pages, 3rd Generation Partnership Project, Valbonne, France (May 13-17, 2019).

"Sidelink Physical Layer Structure," 3GPP TSG-RAN WG1#98, R1-1909015, Prague, Czech Republic, Total 7 pages, 3rd Generation Partnership Project, Valbonne, France (Aug. 26-30, 2019).

* cited by examiner

SIDELINK CONTROL INFORMATION SENDING AND RECEIVING METHOD, TERMINAL APPARATUS, AND SYSTEM

CROSS-REFERENCE TO RELATED APPLICATIONS

This application is a continuation of International Application No. PCT/CN2019/109208, filed on Sep. 29, 2019, the disclosure of which is hereby incorporated by reference in its entirety.

TECHNICAL FIELD

Embodiments of this application relate to the vehicle-to-everything field, and more specifically, to a sidelink control information sending method and a terminal apparatus, a sidelink control information receiving method and a terminal apparatus, and a system.

BACKGROUND

Vehicle-to-everything (V2X) communication refers to communication between a vehicle and everything outside the vehicle, for example, communication between vehicles, communication between the vehicle and a pedestrian, communication between the vehicle and an infrastructure, and communication between the vehicle and a network. A vehicular user equipment (V-UE) can send some information about the vehicular user equipment, for example, a location, a speed, and an intention (turning, paralleling, or reversing), to a surrounding V-UE. The V-UE also receives information about the surrounding V-UE. In this way, communication between the V-UEs, namely, sidelink communication, is completed.

In downlink transmission between a terminal device and a base station, downlink control information (DCI) sent by the base station to the terminal device is carried on a physical downlink control channel (PDCCH). Resource mapping is performed on the PDCCH in a unit of a control channel element (CCE). A quantity of CCEs included on the PDCCH depends on a size of the DCI carried on the PDCCH and a code rate. The quantity of CCEs included on the PDCCH is defined as an aggregation level (AL). The terminal device decodes the PDCCH by performing blind detection (blind decode, BD) in the unit of a CCE, to obtain the DCI.

A physical sidelink control channel (PSCCH) and a physical sidelink shared channel (PSSCH) are introduced to the V2X communication. This is similar to a case of downlink communication. The PSCCH is used to carry sidelink control information (SCI), where the SCI is used to schedule the PSSCH, so that sidelink communication may be performed between the V-UEs.

A difference from the DCI lies in: In view of characteristics of the sidelink communication, the 3rd generation partnership project (3GPP) standards organization proposes that a 2-stage SCI solution be used in a sidelink communication system such as V2X. To be specific, a transmit end device generates first-stage SCI, where the first-stage SCI indicates second-stage SCI, and complete sidelink control information includes both the first-stage SCI and the second-stage SCI.

However, in the sidelink communication, because there are physical layer unicast, physical layer groupcast, physical layer broadcast, and a plurality of different physical layer transmission modes such as a mode based on network device scheduling and a mode in which a terminal device autonomously selects resources, the 2-stage SCI solution may not be applicable to all cases. If the 2-stage SCI is applied to all the cases, resource waste may occur.

SUMMARY

This application provides a sidelink control information sending and receiving method and a terminal apparatus, to improve resource utilization efficiency in sidelink communication.

According to a first aspect, this application provides a sidelink control information sending method. The method includes: A first terminal apparatus sends first-stage sidelink control information SCI to a second terminal apparatus, where the first-stage SCI includes first indication information, and the first indication information is used to indicate whether the first terminal apparatus is to send second-stage sidelink control information SCI to the second terminal apparatus.

If the first indication information indicates that the first terminal apparatus is not to send the second-stage sidelink control information SCI to the second terminal apparatus, the first terminal apparatus sends a physical sidelink shared channel PSSCH to the second terminal apparatus based on the first-stage SCI.

Alternatively, if the first indication information indicates that the first terminal apparatus is to send the second-stage sidelink control information SCI to the second terminal apparatus, the first terminal apparatus sends a physical sidelink shared channel PSSCH to the second terminal apparatus based on the first-stage SCI and the second-stage SCI.

According to the technical solution provided in this application, in a scenario in which the second-stage SCI is not required in a sidelink communication system, a transmit end apparatus (namely, the first terminal apparatus) in sidelink communication indicates, by using the first-stage SCI, a cyclic redundancy check bit corresponding to the first-stage SCI, or a reference signal used to demodulate the first-stage SCI, that the transmit end apparatus is not to send the second-stage SCI to a receive end apparatus (namely, the second terminal apparatus). In this way, the transmit end apparatus may flexibly choose, based on a specific scenario of the sidelink communication, to use 2-stage SCI or 1-stage SCI. When the transmit end apparatus does not send the second-stage SCI, the transmit end apparatus may use a resource corresponding to the second-stage SCI for data transmission or the like, to avoid resource waste caused by using the 2-stage SCI in any scenario of the sidelink communication.

In addition, spectral efficiency of the sidelink communication system may also be improved.

Alternatively, that the transmit end apparatus in sidelink communication does not send the second-stage SCI to the receive end apparatus means that the second-stage SCI does not exist. In other words, the transmit end apparatus in the sidelink communication schedules the PSSCH by using only the first-stage SCI.

With reference to the first aspect, in some implementations of the first aspect, that the first indication information is used to indicate whether the first terminal apparatus is to send second-stage sidelink control information SCI to the second terminal apparatus includes:

The first-stage SCI includes an aggregation level AL field, where the AL field includes at least two valid values, and the at least two valid values include a first valid value, where the first valid value is 0 and 0 is used to indicate that the first terminal apparatus is not to send the second-stage SCI to the second terminal apparatus.

A valid value other than the first valid value in the at least two valid values is used to indicate that the first terminal apparatus is to send the second-stage SCI to the second terminal apparatus, where any one of the valid value other than the first valid value is specifically used to indicate an aggregation level of the second-stage SCI.

In an existing scenario in which the 2-stage SCI is used, the AL that is of the second-stage SCI and that is indicated by the AL field in the first-stage SCI does not equal 0. Therefore, the valid value "0" in the AL field in the first-stage SCI is used to indicate that the AL of the second-stage SCI equals 0, to implicitly indicate that the first terminal apparatus is not to send the second-stage SCI to the second terminal apparatus. In this way, signaling or indication resource overheads are not increased.

With reference to the first aspect, in some implementations of the first aspect, that the first indication information is used to indicate whether the first terminal apparatus is to send second-stage sidelink control information SCI to the second terminal apparatus includes:

The first indication information includes at least two valid values, where a first valid value in the at least two valid values is used to indicate that the first terminal apparatus is not to send the second-stage SCI to the second terminal apparatus.

A second valid value in the at least two valid values is used to indicate that the first terminal apparatus is to send the second-stage SCI to the second terminal apparatus, and the first-stage SCI further includes an aggregation level AL field, where a valid value in the AL field is used to indicate an aggregation level of the second-stage SCI.

In the scenario in which the second-stage SCI is not required, the first terminal apparatus includes the first indication information in the first-stage SCI, to indicate, to the second terminal apparatus, that the first terminal apparatus is not to send the second-stage SCI to the second terminal apparatus. In this way, a compulsory 2-stage SCI solution may be flexibly discarded based on the scenario of the sidelink communication, to avoid the resource waste and also improve the spectral efficiency of the sidelink communication system.

With reference to the first aspect, in some implementations of the first aspect, the first indication information indicates that the first terminal apparatus is not to send the second-stage sidelink control information SCI to the second terminal apparatus, and the first terminal apparatus sends the physical sidelink shared channel PSSCH to the second terminal apparatus based on the first-stage SCI, where a mode of transmitting the PSSCH is broadcast.

In the scenario in which the second-stage SCI is not required, for example, sidelink broadcast transmission, the first terminal apparatus does not send the second-stage SCI to the second terminal apparatus, so that the resource used to send the second-stage SCI is used for another purpose, for example, data transmission, to avoid the resource waste and also improve the spectral efficiency of the sidelink communication system.

According to a second aspect, this application provides a sidelink control information sending method. The method includes: A first terminal apparatus sends first-stage sidelink control information SCI to a second terminal apparatus, where a cyclic redundancy check bit corresponding to the first SCI is scrambled by using scrambling information, and the scrambling information includes a first identifier or a second identifier, where the first identifier is used to indicate that the first terminal apparatus is not to send second-stage SCI to the second terminal apparatus, and the second identifier is used to indicate that the first terminal apparatus is to send the second-stage SCI to the second terminal apparatus.

If the scrambling information includes the first identifier, the first terminal apparatus sends a physical sidelink shared channel PSSCH to the second terminal apparatus based on the first-stage SCI.

Alternatively, if the scrambling information includes the second identifier, the first terminal apparatus sends a physical sidelink shared channel PSSCH to the second terminal apparatus based on the first-stage SCI and the second-stage SCI.

The first terminal apparatus scrambles the CRC corresponding to the first-stage SCI by using different identifiers, to implicitly indicate, to the second terminal apparatus, whether the first terminal apparatus is to send the second-stage SCI to the second terminal apparatus. In this way, the first terminal apparatus may indicate, to the second terminal apparatus without changing a structure of the first-stage SCI, whether the first terminal apparatus is to send the second-stage SCI. This does not cause signaling or indication resource overheads.

With reference to the second aspect, in some implementations of the second aspect, the scrambling information includes the first identifier, and the first terminal apparatus sends the PSSCH to the second terminal apparatus based on the first-stage SCI, where a mode of transmitting the PSSCH is broadcast.

According to a third aspect, this application provides a sidelink control information sending method. The method includes: A first terminal apparatus sends first-stage sidelink control information SCI to a second terminal apparatus.

The first terminal apparatus sends a reference signal to the second terminal apparatus, where the reference signal includes a first reference signal or a second reference signal, where the first reference signal is used to indicate that the first terminal apparatus is not to send second-stage SCI to the second terminal apparatus, and the second reference signal is used to indicate that the first terminal apparatus is to send the second-stage SCI to the second terminal apparatus.

If the reference signal includes the first reference signal, the first terminal apparatus sends a physical sidelink shared channel PSSCH to the second terminal apparatus based on the first-stage SCI.

Alternatively, if the reference signal includes the second reference signal, the first terminal apparatus sends a PSSCH to a terminal device based on the first-stage SCI and the second-stage SCI.

Different reference signals of the first terminal apparatus are used by the second terminal apparatus to perform channel estimation on a PSCCH carrying the first-stage SCI, to decode the first-stage SCI, and whether the first terminal apparatus is to send the second-stage SCI to the second terminal apparatus is implicitly indicated to the second terminal apparatus. In this way, the first terminal apparatus may indicate, to the second terminal apparatus without changing a structure of the first-stage SCI, whether the first terminal apparatus is to send the second-stage SCI. This does not cause signaling or indication resource overheads.

Optionally, with reference to the third aspect, in some implementations of the third aspect, the reference signal includes the first reference signal, and the first terminal apparatus sends the PSSCH to the second terminal apparatus based on the first-stage SCI, where a mode of transmitting the PSSCH is broadcast.

Optionally, with reference to the third aspect, in some implementations of the third aspect, the reference signal includes a demodulation reference signal DMRS that is used to demodulate a sidelink physical control channel PSCCH carrying the first-stage SCI, where the first reference signal is a first DMRS, and the second reference signal is a second DMRS.

The existing DMRS used to perform channel estimation on the PSCCH carrying the first-stage SCI is used to implicitly indicate whether the first terminal apparatus is to send the second-stage SCI to the second terminal apparatus. This does not cause the signaling or indication resource overheads.

It should be noted that sidelink control information sending methods in a fourth aspect to a sixth aspect below are methods performed by the receive end apparatus in the sidelink communication. For beneficial technical effects that may be achieved by technical solutions of the methods, refer to descriptions of the corresponding solutions in the first aspect to the third aspect. Details are not described again.

According to a fourth aspect, this application provides a sidelink control information receiving method. The method includes: A second terminal apparatus receives first-stage SCI from a first terminal apparatus, where the first-stage SCI includes first indication information, and the first indication information is used to indicate whether the first terminal apparatus is to send second-stage SCI to the second terminal apparatus.

If the first indication information indicates that the first terminal apparatus is not to send the second-stage SCI to the second terminal apparatus, the second terminal apparatus receives a physical sidelink shared channel PSSCH from the first terminal apparatus based on the first-stage SCI.

Alternatively, if the first indication information indicates that the first terminal apparatus is to send the second-stage SCI to the second terminal apparatus, the second terminal apparatus receives a PSSCH from the first terminal apparatus based on the first-stage SCI and the second-stage SCI.

With reference to the third aspect, in some implementations of the third aspect, that the first indication information is used to indicate whether the first terminal apparatus is to send second-stage sidelink control information SCI to the second terminal apparatus includes:

The first-stage SCI includes an aggregation level AL field, where the AL field includes at least two valid values, and the at least two valid values include a first valid value, where the first valid value is 0 and 0 is used to indicate that the first terminal apparatus is not to send the second-stage SCI to the second terminal apparatus.

A valid value other than the first valid value in the at least two valid values is used to indicate that the first terminal apparatus is to send the second-stage SCI to the second terminal apparatus, where any one of the valid value other than the first valid value is specifically used to indicate an aggregation level of the second-stage SCI.

With reference to the third aspect, in some implementations of the third aspect, that the first indication information is used to indicate whether the first terminal apparatus is to send second-stage sidelink control information SCI to the second terminal apparatus includes:

The first indication information includes at least two valid values, where a first valid value in the at least two valid values is used to indicate that the first terminal apparatus is not to send the second-stage SCI to the second terminal apparatus.

A second valid value in the at least two valid values is used to indicate that the first terminal apparatus is to send the second-stage SCI to the second terminal apparatus, and the first-stage SCI further includes an aggregation level AL field, where a valid value in the AL field is used to indicate an aggregation level of the second-stage SCI.

With reference to the fourth aspect, in some implementations of the fourth aspect, the first indication information indicates that the first terminal apparatus is not to send the second-stage SCI to the second terminal apparatus, and the second terminal apparatus receives the PSSCH from the first terminal apparatus based on the first-stage SCI, where a mode of transmitting the PSSCH is broadcast.

According to a fifth aspect, this application provides a sidelink control information receiving method. The method includes: A second terminal apparatus receives first-stage sidelink control information SCI from a first terminal apparatus, where a cyclic redundancy check bit corresponding to the first-stage SCI is scrambled by using scrambling information, and the scrambling information includes a first identifier or a second identifier, where the first identifier is used to indicate that the first terminal apparatus is not to send second-stage SCI to the second terminal apparatus, and the second identifier is used to indicate that the first terminal apparatus is to send the second-stage SCI to the second terminal apparatus.

If the scrambling information includes the first identifier, the second terminal apparatus receives a PSSCH from the first terminal apparatus based on the first-stage SCI.

Alternatively, if the scrambling information includes the second identifier, the second terminal apparatus receives a PSSCH from the first terminal apparatus based on the first-stage SCI and the second-stage SCI.

With reference to the fifth aspect, in some implementations of the fifth aspect, the scrambling information includes the first identifier, and the second terminal apparatus receives the PSSCH from the first terminal apparatus based on the first-stage SCI, where a mode of transmitting the PSSCH is broadcast.

According to a sixth aspect, this application provides a sidelink control information receiving method. The method includes: A second terminal apparatus receives first-stage sidelink control information SCI from a first terminal apparatus.

The second terminal apparatus detects a reference signal from the first terminal apparatus. where the reference signal includes a first reference signal or a second reference signal, where the first reference signal is used to indicate that the first terminal apparatus is not to send second-stage SCI to the second terminal apparatus, and the second reference signal is used to indicate that the first terminal apparatus is to send the second-stage SCI to the second terminal apparatus.

If the reference signal includes the first reference signal, the second terminal apparatus receives a physical sidelink shared channel PSSCH from the first terminal apparatus based on the first-stage SCI.

Alternatively, if the reference signal includes the second reference signal, the second terminal apparatus receives a PSSCH from the first terminal apparatus based on the first-stage SCI and the second-stage SCI.

With reference to the sixth aspect, in some implementations of the sixth aspect, the reference signal includes the first reference signal, and the second terminal apparatus receives the PSSCH from the second terminal apparatus based on the first-stage SCI, where a mode of transmitting the PSSCH is broadcast.

With reference to the sixth aspect, in some implementations of the sixth aspect, the reference signal includes a demodulation reference signal DMRS that is used to demodulate a sidelink physical control channel PSCCH carrying the first-stage SCI, where the first reference signal is a first DMRS, and the second reference signal is a second DMRS.

According to a seventh aspect, this application provides a terminal apparatus. The terminal apparatus has a function of implementing the method according to any one of the first aspect or the possible implementations of the first aspect, a function of implementing the method according to any one of the second aspect or the possible implementations of the second aspect, or a function of implementing the method according to any one of the third aspect or the possible implementations of the third aspect. The function may be implemented by hardware, or may be implemented by hardware executing corresponding software. The hardware or the software includes one or more units corresponding to the foregoing functions.

According to an eighth aspect, this application provides a terminal apparatus. The terminal apparatus has a function of implementing the method according to any one of the fourth aspect or the possible implementations of the fourth aspect, a function of implementing the method according to any one of the fifth aspect or the possible implementations of the fifth aspect, or a function of implementing the method according to any one of the sixth aspect or the possible implementations of the sixth aspect. The function may be implemented by hardware, or may be implemented by hardware executing corresponding software. The hardware or the software includes one or more units corresponding to the foregoing functions.

According to a ninth aspect, this application provides a terminal device, including a processor, a memory, and a transceiver. The memory is configured to store a computer program, and the processor is configured to invoke and run the computer program stored in the memory, and control the transceiver to send and receive a signal, so that the terminal device performs the method according to any one of the first aspect or the possible implementations of the first aspect, performs the method according to any one of the second aspect or the possible implementations of the second aspect, or performs the method according to any one of the third aspect or the possible implementations of the third aspect.

According to a tenth aspect, this application provides a terminal device, including a processor, a memory, and a transceiver. The memory is configured to store a computer program, and the processor is configured to invoke and run the computer program stored in the memory, and control the transceiver to send and receive a signal, so that the terminal device performs the method according to any one of the fourth aspect or the possible implementations of the fourth aspect, performs the method according to any one of the fifth aspect or the possible implementations of the fifth aspect, or performs the method according to any one of the sixth aspect or the possible implementations of the sixth aspect.

According to an eleventh aspect, this application provides a computer-readable storage medium. The computer-readable storage medium stores computer instructions; and when the computer instructions are run on a computer, the computer is enabled to perform the method according to any one of the first aspect or the possible implementations of the first aspect, perform the method according to any one of the second aspect or the possible implementations of the second aspect, or perform the method according to any one of the third aspect or the possible implementations of the third aspect.

According to a twelfth aspect, this application provides a computer-readable storage medium. The computer-readable storage medium stores computer instructions; and when the computer instructions are run on a computer, the computer is enabled to perform the method according to any one of the fourth aspect or the possible implementations of the fourth aspect, perform the method according to any one of the fifth aspect or the possible implementations of the fifth aspect, or perform the method according to any one of the sixth aspect or the possible implementations of the sixth aspect.

According to a thirteenth aspect, this application provides a computer program product. The computer program product includes computer program code; and when the computer program code is run on a computer, the computer is enabled to perform the method according to any one of the first aspect or the possible implementations of the first aspect, perform the method according to any one of the second aspect or the possible implementations of the second aspect, or perform the method according to any one of the third aspect or the possible implementations of the third aspect.

According to a fourteenth aspect, this application provides a computer program product. The computer program product includes computer program code; and when the computer program code is run on a computer, the computer is enabled to perform the method according to any one of the fourth aspect or the possible implementations of the fourth aspect, perform the method according to any one of the fifth aspect or the possible implementations of the fifth aspect, or perform the method according to any one of the sixth aspect or the possible implementations of the sixth aspect.

According to a fifteenth aspect, this application provides a terminal apparatus, including a processor and an interface circuit. The interface circuit is configured to receive computer code or instructions and transmit the computer code or the instructions to the processor. The processor is configured to run the computer code or the instructions, to perform the method according to any one of the first aspect or the possible implementations of the first aspect, perform the method according to any one of the second aspect or the possible implementations of the second aspect, or perform the method according to any one of the third aspect or the possible implementations of the third aspect.

According to a sixteenth aspect, this application provides a terminal apparatus, including a processor and an interface circuit. The interface circuit is configured to receive computer code or instructions and transmit the computer code or the instructions to the processor. The processor is configured to run the computer code or the instructions, to perform the method according to any one of the fourth aspect or the possible implementations of the fourth aspect, perform the method according to any one of the fifth aspect or the possible implementations of the fifth aspect, or perform the method according to any one of the sixth aspect or the possible implementations of the sixth aspect.

According to a seventeenth aspect, this application provides a sidelink communication system, including the terminal device according to the ninth aspect and/or the terminal device according to the tenth aspect.

DESCRIPTION OF EMBODIMENTS

The following describes the technical solutions in this application with reference to the accompanying drawings.

The technical solutions in this application may be applied to any device-to-device (D2D) network, for example, a vehicle-to-everything (V2X) communication system, a V2V communication system, a V2I communication system, a V2P communication system, a V2N communication system, an intelligent connected vehicle (intelligent connected vehicle, ICV) communication system, an autonomous driving communication system, or an assisted driving communication system. In addition, the technical solutions are applicable to a communication scenario with network coverage and a communication scenario without network coverage.

Figure 1:
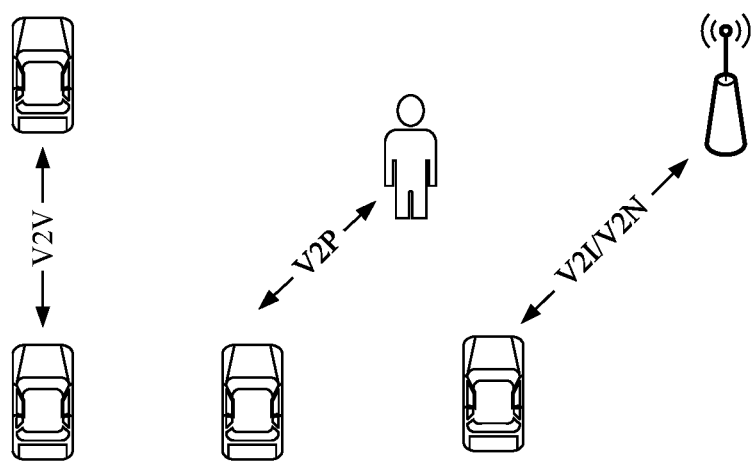
FIG. 1 is a schematic diagram of a V2X communication scenario.

FIG. 1 is a schematic diagram of a V2X communication scenario. In V2X communication, a link between a vehicular user equipment (V-UE) and another vehicular user equipment, between pedestrian user equipment and the vehicular user equipment, or between roadside unit (RSU) devices is referred to as a sidelink (SL). A link between vehicular user equipment and a network device is referred to as a downlink (DL) or an uplink (UL), an air interface of the link is also referred to as a Uu air interface, and corresponding DL communication and UL communication are also referred to as Uu communication.

In the V2X communication, terminal devices communicate with each other.

A terminal device in this application may also be referred to as a terminal apparatus, and includes but is not limited to user equipment (UE), a wireless terminal device, a mobile terminal device, a device-to-device (D2D) terminal device, a V2X terminal device, a machine type communication (M2M/MTC) terminal device, an internet of things (IoT) terminal device, a user terminal, a user agent, a user device, or the like. For example, the terminal device may include a mobile phone (or referred to as a "cellular" phone), or a computer with a mobile terminal device, for example, a portable, pocket-sized, handheld, or computer built-in mobile apparatus. For another example, the terminal device may include a device such as a personal communications service (PCS) phone, a cordless phone, a session initiation protocol (SIP) phone, a wireless local loop (WLL) station, or a personal digital assistant (PDA). In addition, the terminal device may alternatively be a vehicle-mounted communication module or another embedded communication module. The vehicle-mounted communication module may also be referred to as a vehicle-mounted terminal device or an on-board unit (OBU). The terminal device in embodiments of this application may alternatively be a vehicle-mounted module, a vehicle-mounted module, a vehicle-mounted component, a vehicle-mounted chip, or a vehicle-mounted unit that is built into a vehicle as one or more components or units. The vehicle may implement a method in this application by using the built-in vehicle-mounted module, vehicle-mounted module, vehicle-mounted component, vehicle-mounted chip, or vehicle-mounted unit.

A network device in this application includes, for example, an access network (AN) device, for example, a base station (for example, an access point), and may be a device that communicates with a wireless terminal device over an air interface in an access network via one or more cells, or may be, for example, a network device in a vehicle-to-everything (V2X) technology, for example, a road side unit (RSU). The base station may be configured to mutually convert a received over-the-air frame and an IP packet, and serve as a router between a terminal device and a remaining part of the access network, where the remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB, evolutional NodeB) in a long term evolution (long term evolution. LTE) system or a long term evolution-advanced (LTE-A) system, may include a next generation NodeB (next generation node B, gNB) in a 5th generation mobile communication technology (the 5th generation. 5G) new radio (NR) system (which is also referred to as an NR system for short), or may include a centralized unit (CU) and a distributed unit (DU) in a cloud radio access network (Cloud RAN) system. This is not limited in embodiments of this application.

Certainly, the network device may further include a core network device. However, because the technical solutions provided in embodiments of this application mainly relate to the access network device, unless otherwise specified in the following descriptions, the described "core network device" refers to the core network device, and the described "network device" or "access network device" refers to the access network device.

The following briefly describes 2-stage SCI in this application.

In sidelink communication, a transmit end device sends sidelink scheduling information to schedule a receive end device to receive data information, where the sidelink scheduling information is SCI. According to a protocol standard proposed by 3GPP, the SCI in a sidelink communication system may be classified into two stages, namely, first-stage SCI (Ist-stage SCI) and second-stage SCI (2nd-stage SCI). Certainly, the SCI may alternatively include more than two stages of SCI.

The first-stage SCI is carried on a physical sidelink control channel (PSCCH). The first-stage SCI includes sidelink control information used to decode a PSSCH. For example, the first-stage SCI may include one or more of the following fields:

a field indicating a priority of the scheduled physical sidelink shared channel (PSSCH), where the field is used to indicate information about the priority of the PSSCH and may have a length of three or four bits:

a field indicating scheduling information of a time-frequency resource for the PSSCH, where the field may have a length of eight or nine bits:

a resource reservation information field used for retransmitting the PSSCH, where for example, a time interval between different retransmitted PSSCHs, where the field may have a length of four or five bits:

a sequence number field that is used for retransmitting the PSSCH, where the field may indicate a sequence number of current PSSCH retransmission, and may have a length of two bits:

a resource reservation information field used for transmitting a new PSSCH, for example, a resource reservation used for a periodic service, where the field may have a length of four or five bits;

a PSSCH modulation and coding scheme (modulation and coding scheme, MCS) field, which may have a length of five bits:

an indication information field indicating a demodulation reference signal (DMRS) pattern of the PSSCH (where the field may have a length of two or three bits):

format indication information of the second-stage SCI, where the format indication information may indicate whether content included in the second-stage SCI includes information about a location of the transmit end device, information about a communication range requirement for receiving the PSSCH, and the like, that is, indicate whether a HARQ feedback manner of the PSSCH is a manner in which only a NACK is fed back based on a communication distance between a transmit end and a receive end or a manner in which an ACK and/or a NACK are/is fed back, and the format indication information may also be indirectly used to distinguish among unicast transmission, groupcast transmission with group establishment and maintenance, and groupcast transmission without group establishment or maintenance, where the format indication information may have a length of one bit; and a resource pool identity field, where the field is used to distinguish between different resource pools and may have a length of four or five bits, and the resource pool is a set of available time-frequency resources used by the transmit end device and the receive end device in sidelink communication to perform sidelink communication.

In addition, the first-stage SCI may further include a resource indication information field for the second-stage SCI. The resource indication information field may be, for example, an AL field (which may have a length of three or four bits). The AL field is used to indicate an AL of the second-stage SCI, namely, a quantity of basic resource elements that are aggregated into a resource of the second-stage SCI and that are used to transmit the second-stage SCI.

The second-stage SCI includes sidelink control information required for decoding the PSSCH other than the sidelink control information included in the first-stage SCI.

For example, the second-stage SCI may include one or more of the following fields:

a HARQ activation information field that indicates whether the receive end device needs to feed back HARQ-ACK information (for example, an ACK or a NACK) to the transmit end device on a physical sidelink feedback channel (PSFCH). The HARQ activation information field may include one-bit information used to indicate unicast transmission and/or groupcast transmission, where the one-bit information includes a valid value, for example. "1". In a manner of groupcast with feedback that is not based on a transmit end device-receive end device distance-based HARQ (Tx-Rx distance-based HARQ), the receive end device in groupcast is known to the transmit end device. If the receive end device correctly receives data, the ACK is fed back: or if the receive end device incorrectly receives data, the NACK is fed back. It may be inferred that another valid value, for example. "0", in the HARQ activation information field indicates that the receive end device does not need to feed back HARQ information.

If the second-stage SCI includes a field indicating the information about the communication range requirement for receiving the PSSCH (where the field is used for a manner of groupcast with feedback that is based on the transmit end device-receive end device distance-based HARQ (Tx-Rx distance-based HARQ)), when a value of the information about the communication range requirement for receiving the PSSCH is 0), it indicates that the receive end device in the manner of groupcast with the feedback that is based on the transmit end device-receive end device distance-based HARQ does not need to feed back the HARQ information: or when a value of the information about the communication range requirement for receiving the PSSCH is greater than 0, the HARQ information needs to be fed back.

Complete sidelink control information includes both the first-stage SCI and the second-stage SCI, to indicate the receive end device to receive the PSSCH. Therefore, a data transmission procedure in the sidelink communication is approximately as follows:

The transmit end device sends the PSCCH to the receive end device, where the PSCCH carries the first-stage SCI.

The receive end device performs, based on a DMRS from the transmit end device, channel estimation on the PSCCH that carries the first-stage SCI, to decode the first-stage SCI, thereby obtaining the sidelink control information that is included in the first-stage SCI and that is used to decode the PSSCH.

Further, the receive end device may learn of the AL of the second-stage SCI based on the AL field in the first-stage SCI, thereby receiving the second-stage SCI and obtaining the sidelink control information, other than the sidelink control information included in the first-stage SCI, that is included in the second-stage SCI and that is used to decode the PSSCH.

The receive end device receives and decodes the PSSCH based on the sidelink control information included in the first-stage SCI and the second-stage SCI, to complete the sidelink communication.

However, a 2-stage SCI solution is not applicable to all scenarios of the sidelink communication. For example, in the sidelink communication system, there may be a physical layer unicast scenario, a physical layer groupcast scenario, a physical layer broadcast scenario, and different physical layer transmission modes such as a mode in which a network device schedules resources and a transmission mode in which a terminal device autonomously selects resources. In some scenarios, an indication by using the 2-stage SCI may not be required.

For example, in a sidelink broadcast transmission scenario, all sidelink scheduling information required for transmitting sidelink broadcast data may be included in the first-stage SCI. In this case, if the transmit end device continues to send the second-stage SCI to the receive end device, for one thing, a time-frequency resource used to send the second-stage SCI is wasted: for another, spectral efficiency of the sidelink communication system is reduced.

For another example, in a sidelink communication process, if the receive end device obtains a part of configuration information for transmitting the PSSCH, by using a configured grant, that is, by using RRC signaling over a Uu air interface or RRC signaling over a PC-5 air interface, the transmit end device either does not need to indicate, by sending the second-stage SCI, the receive end device to decode the PSSCH sent by the transmit end device. In this scenario, the second-stage SCI is also redundant.

Considering that there are a plurality of scenarios (for example, the foregoing enumerated scenarios) in which the 2-stage SCI is not suitable in the sidelink communication, this application provides a sidelink control information sending method, to remove the 2-stage SCI from the sidelink communication. In a scenario in which the second-stage SCI is not required, the transmit end device notifies the receive end device that the transmit end device is not to send the second-stage SCI to the receive end device, so that a resource used to send the second-stage SCI is used for another purpose, for example, data transmission, to avoid resource waste and also improve the spectral efficiency of the sidelink communication system.

The following describes in detail the technical solutions provided in this application.

It should be noted that a first terminal apparatus in the following may be the transmit end device in the sidelink communication or may be a circuit system installed in the transmit end device, for example, a chip or an integrated circuit. A second terminal apparatus may be the receive end device in the sidelink communication or may be a circuit system installed in the receive end device, for example, a chip or an integrated circuit.

Optionally, the chip described herein may be a system-on-a-chip (SoC), a baseband chip, or the like.

Figure 2:
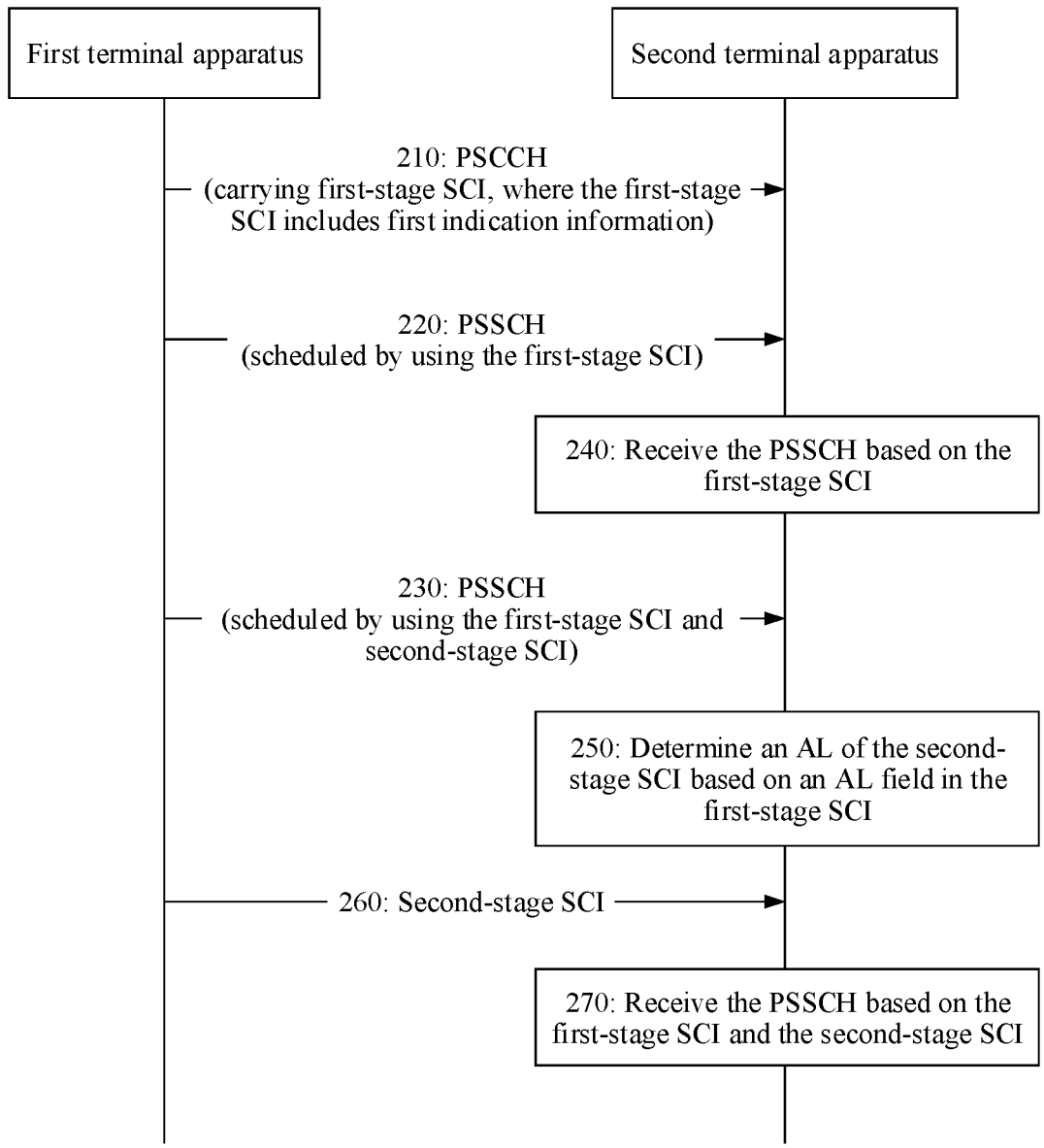
FIG. 2 is a flowchart of a sidelink control information sending method 200 according to this application.

FIG. 2 is a flowchart of a sidelink control information sending method 200 according to this application.

210: A first terminal apparatus sends first-stage SCI to a second terminal apparatus.

The first-stage SCI may also be referred to as first sidelink control information. In this application, the first terminal apparatus may also be referred to as a transmit end device or a transmit end apparatus, and the second terminal apparatus may also be referred to as a receive end device or a receive end apparatus.

The first-stage SCI includes first indication information, where the first indication information is used to indicate whether the first terminal apparatus is to send second-stage SCI to the second terminal apparatus, and the second-stage SCI may also be referred to as second sidelink control information.

In a possible case, the first indication information specifically indicates that the first terminal apparatus is not to send the second-stage SCI to the second terminal apparatus.

In another possible case, the first indication information specifically indicates that the first terminal apparatus is to send the second-stage SCI to the second terminal apparatus.

Correspondingly, the second terminal apparatus receives the first-stage SCI from the first terminal apparatus.

In addition, for the first-stage SCI and the second-stage SCI, refer to the foregoing descriptions. Details are not described herein again.

If the first indication information specifically indicates that the first terminal apparatus is not to send the second-stage SCI to the second terminal apparatus, the first terminal apparatus performs step 220. If the first indication information specifically indicates that the first terminal apparatus is to send the second-stage SCI to the second terminal apparatus, the first terminal apparatus performs step 230.

220): The first terminal apparatus sends a PSSCH to the second terminal apparatus based on the first-stage SCI.

In step 210, the second terminal apparatus receives the first-stage SCI. If the first indication information specifically indicates, based on the first indication information carried in the first-stage SCI, that the first terminal apparatus is not to send the second-stage SCI to the second terminal apparatus, the second terminal apparatus receives the PSSCH from the first terminal apparatus based on the first-stage SCI, as mentioned below in step 240.

230: The first terminal apparatus sends the second-stage SCI to the second terminal apparatus based on the first-stage SCI and the second-stage SCI.

In step 210, the second terminal apparatus receives the first-stage SCI. If the first indication information specifically indicates, based on the first indication information carried in the first-stage SCI, that the first terminal apparatus is to send the second-stage SCI to the second terminal apparatus, the second terminal apparatus receives the PSSCH from the first terminal apparatus based on the first-stage SCI and the second-stage SCI, as mentioned below in steps 250 to 270.

It can be learned that, in the method 200, the first terminal apparatus may indicate, to the second terminal apparatus by using the first-stage SCI, whether the first terminal apparatus is to send the second-stage SCI to the second terminal apparatus.

If the first terminal apparatus indicates, by using the first indication information included in the first-stage SCI, that the first terminal apparatus is not to send the second-stage SCI to the second terminal apparatus, it indicates that the PSSCH is scheduled by using sidelink control information included only in the first-stage SCI.

Therefore, the first terminal apparatus sends the PSSCH to the second terminal apparatus based on the first-stage SCI.

Correspondingly, the second terminal apparatus receives the first-stage SCI from the first terminal apparatus, and may learn, based on the first indication information included in the first-stage SCI, that the first terminal apparatus is not to send the second-stage SCI to the second terminal apparatus. Therefore, the second terminal apparatus receives the PSSCH from the first terminal apparatus based on the sidelink control information included in the received first-stage SCI.

If the first terminal apparatus indicates, by using the first indication information included in the first-stage SCI, that the first terminal apparatus is to send the second-stage SCI to the second terminal apparatus, it indicates that the PSSCH is scheduled by using sidelink control information included in the first-stage SCI and the second-stage SCI. The first terminal apparatus further needs to send the second-stage SCI to the second terminal apparatus.

Therefore, the first terminal apparatus sends the PSSCH to the second terminal apparatus based on the first-stage SCI and the second-stage SCI.

Correspondingly, the second terminal apparatus receives the first-stage SCI from the first terminal apparatus, and may learn, based on the first indication information included in the first-stage SCI, that the first terminal apparatus is to send the second-stage SCI to the second terminal apparatus. This indicates that the first terminal apparatus uses 2-stage SCI to schedule the PSSCH. Therefore, the second terminal apparatus further needs to receive the second-stage SCI from the first terminal apparatus. The second terminal apparatus receives the PSSCH from the first terminal apparatus based on the first-stage SCI and the second-stage SCI.

According to the technical solution provided in the method 200, in sidelink communication, the first terminal apparatus may flexibly indicate, to the second terminal apparatus based on a communication requirement, for example, whether to schedule the PSSCH by using the 2-stage SCI or by using the first-stage SCI, whether the second-stage SCI is to be sent. In this way, resource waste caused by using the 2-stage SCI in any sidelink communication scenario may be avoided, in other words, resource utilization efficiency may be improved. In addition, spectral efficiency of a system may also be improved.

The following provides several examples of the first indication information included in the first-stage SCI.

Example 1

The first-stage SCI includes an AL field, where the AL field includes at least two valid values, and a first valid value in the at least two valid values is used to indicate that the first terminal apparatus is not to send the second-stage SCI to the second terminal apparatus, where the first valid value is 0.

As described above, the first-stage SCI includes the AL field, where the AL field is used to indicate an AL of the second-stage SCI.

In this application, the AL of the second-stage SCI may indicate a quantity of basic resource elements that are aggregated into resource elements of the second-stage SCI and that are used to transmit the second-stage SCI. The basic resource element of the second-stage SCI may be a common second-stage sidelink control element (common $2^{nd}$-stage sidelink control element, CSCE). The common second-stage sidelink control element is a set including several consecutive resource elements (resource element, RE) or a set including several resource blocks (resource block, RB). For example, the basic resource element of the second-stage SCI may be six consecutive RBs and is used to decode a DMRS resource of the second-stage CSI. A size of the basic resource element is not limited in this application.

Therefore, the AL field in the first-stage SCI may be used to indicate a quantity of CSCEs included in the second-stage SCI. The AL field may alternatively be used to indicate a quantity of RBs, REs, or the like included in the second-stage SCI.

Optionally, the CSCE may be the set including several consecutive REs, or may be a set including several RBs.

For the transmit end device and the receive end device, a start location of a time-frequency resource of the second-stage SCI is known. For example, the start location of the time-frequency resource of the second-stage SCI may be obtained based on a specified correspondence and a location of a time-frequency resource of the first-stage SCI. This is not limited in this application. Further, the transmit end device may indicate resource scheduling information of the second-stage SCI by using indication information in the AL field.

Specifically, the AL field may include N bits, where N is a positive integer.

It may be understood that, in a solution in which the 2-stage SCI is used, the transmit end apparatus sends the first-stage SCI and the second-stage SCI to the receive end apparatus, in other words, the second-stage SCI inevitably exists. Therefore, the aggregation level AL of the second-stage SCI is generally greater than or equal to 1.

It should be understood that when a quantity N of bits included in the AL field is determined, a quantity of valid values in the AL field is also determined.

For example, when the AL field includes three bits, the AL field includes 16 valid values 000 to 111 (namely, 0) to 15 in decimal) which may be represented by indexes 0) to 15 respectively. When the AL field includes two bits, the AL field includes four valid values 00 to 11 (namely, 0 to 3 in decimal) which may be represented by indexes 0) to 3 respectively.

However, in an existing scenario in which the 2-stage SCI is used, the AL that is of the second-stage SCI and that is indicated by the first-stage SCI does not equal 0.

Therefore, it is proposed in this application, that the AL of the second-stage SCI equals 0 is used to implicitly indicate that the first terminal apparatus is not to send the second-stage SCI to the second terminal apparatus.

It may be understood that the first valid value "0" is a decimal representation of the valid value in the AL field.

To reduce indication overheads, each valid value in the AL field corresponds to a unique index. Therefore, a mapping relationship between an index corresponding to a valid value in the AL field in the first-stage SCI and an AL of the second-stage SCI may be listed in Table 1.

TABLE 1

| Index (index) of the valid value in the AL field | AL |
|---|---|
| 0 | 0 (the first terminal apparatus is not to send the second-stage SCI to the second terminal apparatus) |
| 1 | 1 |
| 2 | 2 |
| 3 | 4 |
| 4 | 6 |
| 5 | 8 |
| 6 | 10 |
| 7 | 12 |

It should be noted that the values listed in Table 1 are merely examples. The valid value in the AL field may be a part of the values in Table 1 or another value not listed in Table 1.

It should be understood that, in this implementation, the AL field includes the at least two valid values, where the valid value "0" in the at least two valid values is used to indicate that the first terminal apparatus is not to send the second-stage SCI to the second terminal apparatus.

In this example, the valid value "0" is the first valid value mentioned in this specification.

In addition, a valid value other than the first valid value in the at least two valid values in the AL field in the first-stage SCI is used to indicate that the first terminal apparatus is to send the second-stage SCI to the second terminal apparatus, where any one of the valid value other than the first valid value specifically indicates the AL of the second-stage SCI. In addition, the AL of the second-stage SCI indicated by the valid value other than the first valid value is not 0.

The first terminal apparatus and the second terminal apparatus may separately store the mapping relationship listed in Table 1. The second terminal apparatus determines, based on the index carried in the AL field in the received first-stage SCI, whether the first terminal apparatus is to send the second-stage SCI.

Case 1

If the AL field in the first-stage SCI carries the index 0 (namely, the first valid value), it indicates that the first terminal apparatus is not to send the second-stage SCI. In this case, the second terminal apparatus receives the corresponding PSSCH based on the correctly decoded first-stage SCI, as shown in step 240.

240: The second terminal apparatus receives the corresponding PSSCH based on the correctly decoded first-stage SCI.

In this case, because the first terminal apparatus sends only the first-stage SCI to the second terminal apparatus, the corresponding PSSCH mentioned in step 240 refers to the PSSCH scheduled by using the first-stage SCI.

Case 2

If the AL field in the first-stage SCI carries an index other than 0 (namely, the valid value other than the first valid value), it indicates that the first terminal apparatus is to send the second-stage SCI to the second terminal.

When the AL field in the first-stage SCI indicates that the first terminal apparatus is to send the second-stage SCI to the second terminal apparatus, the second terminal apparatus may further perform steps 250 to 270.

250: The second terminal apparatus determines the AL of the second-stage SCI based on the AL field in the first-stage SCI.

Specifically, the second terminal apparatus may determine, based on the valid value other than the first valid value (or the index other than 0) carried in the AL field in the first-stage SCI, a value that is of the AL and that corresponds to the valid value other than the first valid value.

For example, if the AL field in the first-stage SCI carries an index 7, it indicates that the AL of the second-stage SCI is 12.

260: The second terminal apparatus receives the second-stage SCI from the first terminal apparatus based on the determined AL of the second-stage SCI.

For the first terminal apparatus, if the AL field in the first-stage SCI indicates that the first terminal apparatus is to send the second-stage SCI to the second terminal apparatus, the first terminal apparatus further sends, after sending the first-stage SCI, the second-stage SCI to the second terminal apparatus. The second terminal apparatus receives the second-stage SCI based on the value of the AL indicated by the AL field in the first-stage SCI.

270: The second terminal apparatus receives the corresponding PSSCH based on the first-stage SCI and the second-stage SCI.

When the first terminal apparatus sends the second-stage SCI to the second terminal apparatus, the second terminal apparatus receives the corresponding PSSCH based on the correctly decoded first-stage SCI and second-stage SCI.

In step 270, the "corresponding PSSCH" refers to a PSSCH jointly scheduled by using the first-stage SCI and the second-stage SCI.

It should be understood that numbers of the steps in the method 200 are merely intended to clearly describe the technical solution, and do not represent an actual sequence of the steps. For example, a time sequence relationship between step 230 and step 260 may be: The first terminal apparatus first sends the PSSCH and then sends the second-stage SCI, the first terminal apparatus first sends the second-stage SCI and then sends the PSSCH, or the PSSCH and the second-stage SCI may be simultaneously sent. Correspondingly, there is no sequence relationship between receiving the second-stage SCI and receiving the PSSCH by the receive end apparatus. Therefore, the numbers of the steps shown in FIG. 2 should constitute no limitation on the solution of this application.

In conclusion, when the first terminal apparatus does not send the second-stage SCI to the second terminal apparatus, the method 200 shown in FIG. 2 includes step 210, step 220, and step 240. When the first terminal apparatus sends the second-stage SCI to the second terminal apparatus, the method 200 includes step 210, step 230, and steps 250 to 270.

In addition, these steps are merely numbered for describing the technical solution. A specific procedure may include fewer steps than the steps shown in FIG. 2, or may include more other steps. This is not limited in this specification.

In the example 1, the valid value "0" in the AL field in the first-stage SCI is used to indicate that the AL of the second-stage SCI equals 0, to implicitly indicate that the first terminal apparatus is not to send the second-stage SCI to the second terminal apparatus. In this way, signaling or indication resource overheads are not increased.

Example 2

In the example 2, the first indication information is additionally added to the first-stage SCI, where the first indication information is used to indicate whether the first terminal apparatus is to send the second-stage SCI to the second terminal apparatus.

In this implementation, the first-stage SCI includes both an AL field and the first indication information.

Optionally, the first indication information may include one bit, where the bit is used to indicate whether the first terminal apparatus is to send the second-stage SCI to the second terminal apparatus. For example, the first indication information includes two valid values: "0" and "1". 0 indicates that the first terminal apparatus is not to send the second-stage SCI to the second terminal apparatus, and 1 indicates that the first terminal apparatus is to send the second-stage SCI to the second terminal apparatus.

Further, when the first indication information specifically indicates that the first terminal apparatus is to send the second-stage SCI to the second terminal apparatus, the value of the AL of the second-stage SCI may be indicated by the AL field in the first-stage SCI. The AL that is of the second-stage SCI and that is indicated by the AL field in the first-stage SCI is not 0.

In this implementation, the first indication information includes two valid values. One valid value is used to indicate that the first terminal apparatus is not to send the second-stage SCI to the second terminal apparatus, and the other valid value is used to indicate that the first terminal apparatus is to send the second-stage SCI to the second terminal apparatus.

Similarly, the second terminal apparatus may determine, based on the valid value in the first indication information, whether the first terminal apparatus is to send the second-stage SCI. When the first indication information indicates that the first terminal apparatus is not to send the second-stage SCI, the second terminal apparatus performs step 230. When the first indication information indicates that the first terminal apparatus is to send the second-stage SCI, the second terminal apparatus performs steps 250 to 270. For details, refer to the foregoing descriptions. The details are not described herein again.

Figure 3:
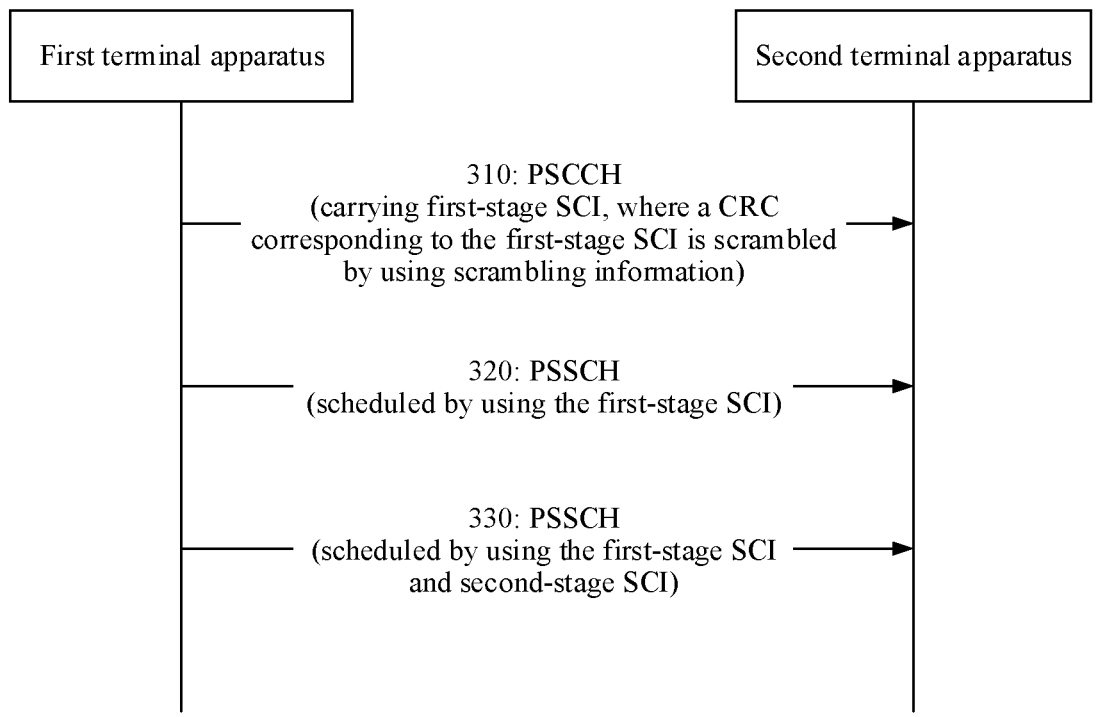
FIG. 3 is a flowchart of a sidelink control information sending method 300 according to this application.

In the method 200, the first terminal apparatus indicates, to the second terminal apparatus by using the first indication information carried in the first-stage SCI, whether the first terminal apparatus is to send the second-stage SCI to the second terminal apparatus. Some other methods for the first terminal apparatus to indicate, to the second terminal apparatus, whether to send the second-stage SCI are provided below:

FIG. 3 is a flowchart of a sidelink control information sending method 300 according to this application.

310: A first terminal apparatus sends first-stage SCI to a second terminal apparatus.

A cyclic redundancy check bit corresponding to the first-stage SCI is scrambled by using scrambling information. The scrambling information includes a first identifier or a second identifier, where the first identifier is used to indicate that the first terminal apparatus is not to send second-stage SCI to the second terminal apparatus, and the second identifier is used to indicate that the first terminal apparatus is to send the second-stage SCI to the second terminal apparatus.

In a possible case, the cyclic redundancy check bit corresponding to the first-stage SCI is scrambled by using the first identifier.

In another possible case, the cyclic redundancy check bit corresponding to the first-stage SCI is scrambled by using the second identifier.

If the cyclic redundancy check (cyclic redundancy check. CRC) corresponding to the first-stage SCI is scrambled by using the first identifier, it indicates that the first terminal apparatus is not to send the second-stage SCI to the second terminal apparatus, and the first terminal apparatus performs step 320.

If the CRC corresponding to the first-stage SCI is scrambled by using the second identifier. it indicates that the first terminal apparatus is to send the second-stage SCI to the second terminal apparatus, and the first terminal apparatus further sends the second-stage SCI to the second terminal apparatus and performs step 330.

Correspondingly, the second terminal apparatus receives the first-stage SCI from the first terminal apparatus and descrambles the CRC corresponding to the first-stage SCI.

If the second terminal apparatus successfully descrambles the CRC corresponding to the first-stage SCI by using the first identifier, it means that the first terminal apparatus is not to send the second-stage SCI to the second terminal apparatus. If the second terminal apparatus successfully descrambles the CRC corresponding to the first-stage SCI by using the second identifier, it means that the first terminal apparatus is to send the second-stage SCI to the second terminal apparatus.

320: The first terminal apparatus sends a PSSCH to the second terminal apparatus based on the first-stage SCI.

In step 310, the second terminal apparatus receives the first-stage SCI. The second terminal apparatus may learn, by descrambling the CRC corresponding to the first-stage SCI, whether the first terminal apparatus is to send the second-stage SCI to the second terminal apparatus.

When the second terminal apparatus successfully descrambles the CRC corresponding to the first-stage SCI by using the first identifier, the second terminal apparatus receives the PSSCH from the first terminal apparatus based on the first-stage SCI.

330: The first terminal apparatus sends the second-stage SCI to the second terminal apparatus based on the first-stage SCI and the second-stage SCI.

When the second terminal apparatus successfully descrambles the CRC corresponding to the first-stage SCI by using the second identifier, it means that the first terminal apparatus is to send the second-stage SCI to the second terminal apparatus. In this case, the second terminal apparatus further receives the second-stage SCI from the first terminal apparatus based on an AL that is of the second-stage SCI and that is indicated by an AL field in the first-stage SCI. Finally, the second terminal apparatus receives the PSSCH from the first terminal apparatus based on the first-stage SCI and the second-stage SCI.

It should be noted that, the first identifier and the second identifier in the method 300 are used to implicitly indicate, to the second terminal apparatus, whether the first terminal apparatus is to send the second-stage SCI. Therefore, specific structures of the first identifier and the second identifier are not concerned in the solution of this application provided that the first identifier and the second identifier are defined to be different.

It can be learned that, in the method 300, the first terminal apparatus may use different identifiers to scramble the CRC corresponding to the first-stage SCI, to implicitly indicate, to the second terminal apparatus, whether the first terminal apparatus is to send the second-stage SCI to the second terminal apparatus.

According to the method 300, the first terminal apparatus may indicate, to the second terminal apparatus without changing a structure of the first-stage SCI, whether the first terminal apparatus is to send the second-stage SCI. This does not cause signaling or indication resource overheads.

Figure 4:
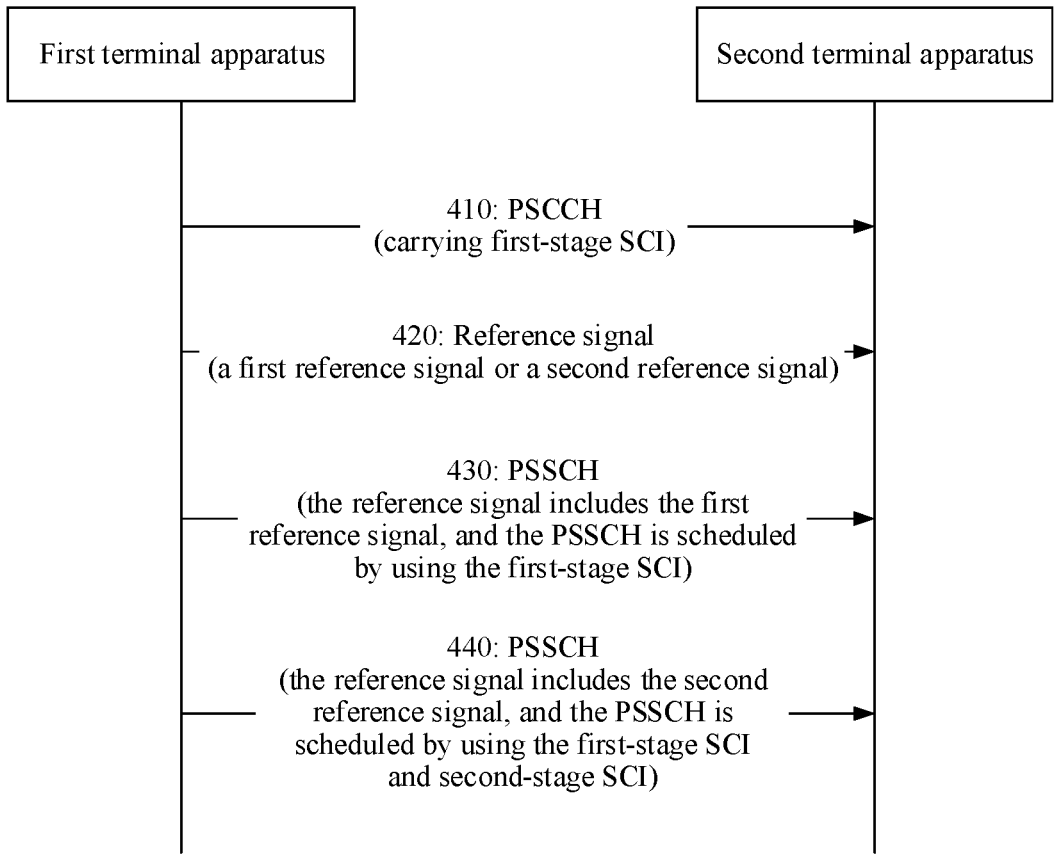
FIG. 4 is a flowchart of a sidelink control information sending method 400 according to this application.

FIG. 4 is a flowchart of a sidelink control information sending method 400 according to this application.

410: A first terminal apparatus sends first-stage SCI to a second terminal apparatus.

420: The first terminal apparatus sends a reference signal to the second terminal apparatus.

The reference signal includes a first reference signal or a second reference signal. The first reference signal is used to indicate that the first terminal apparatus is not to send second-stage SCI to the second terminal apparatus, and the second reference signal is used to indicate that the first terminal apparatus is to send the second-stage SCI to the second terminal apparatus.

Optionally, the reference signal may be a DMRS. Correspondingly, the first reference signal may be a first DMRS, and the second reference signal may be a second DMRS.

A person skilled in the art should understand that, in step 420, the reference signal sent by the first terminal apparatus to the second terminal apparatus is used by the second terminal apparatus to perform estimation on a channel, to decode a PSCCH that carries the first-stage SCI.

In a possible case, the first terminal apparatus sends the first reference signal to the second terminal apparatus to perform channel estimation.

In another possible case, the first terminal apparatus sends the second reference signal to the second terminal apparatus to perform channel estimation.

If the first terminal apparatus sends the first reference signal to the second terminal apparatus, it means that the first terminal apparatus is not to send the second-stage SCI to the second terminal apparatus, and the first terminal apparatus performs step 430.

If the first terminal apparatus sends the second reference signal to the second terminal apparatus, it means that the first terminal apparatus is to send the second-stage SCI to the second terminal apparatus, and the first terminal apparatus performs step 440.

Correspondingly, the second terminal apparatus detects the reference signal from the first terminal apparatus. If the second terminal apparatus detects the first reference signal, the second terminal apparatus learns that the first terminal apparatus is not to send the second-stage SCI.

If the second terminal apparatus detects the second reference signal, the second terminal apparatus learns that the first terminal apparatus is to send the second-stage SCI.

430: The first terminal apparatus sends a PSSCH to the second terminal apparatus based on the first-stage SCI.

In step 420, the second terminal apparatus detects the first reference signal sent by the first terminal apparatus, to learn that the first terminal apparatus is not to send the second-stage SCI to the second terminal apparatus. Therefore, the second terminal apparatus receives the PSSCH from the first terminal apparatus based on the first-stage SCI.

440: The first terminal apparatus sends the second-stage SCI to the second terminal apparatus based on the first-stage SCI and the second-stage SCI.

In step 420, the second terminal apparatus detects the second reference signal sent by the first terminal apparatus, to learn that the first terminal apparatus is to send the second-stage SCI to the second terminal apparatus. In this case, the second terminal apparatus further receives the second-stage SCI from the first terminal apparatus based on an AL that is of the second-stage SCI and that is indicated by an AL field in the first-stage SCI. Finally, the second terminal apparatus receives the PSSCH from the first terminal apparatus based on the first-stage SCI and the second-stage SCI.

Similar to the foregoing first identifier and second identifier, the first reference signal and the second reference signal in the method 400 are used to implicitly indicate, to the second terminal apparatus, whether the first terminal apparatus is to send the second-stage SCI. Therefore, mapping patterns of the first reference signal and the second reference signal are not concerned in the solution of this application provided that the first reference signal and the second reference signal are differently defined.

It can be learned that, in the method 400, different reference signals of the first terminal apparatus are used by the second terminal apparatus to perform channel estimation, to decode the PSCCH that carries the first-stage SCI, and whether the first terminal apparatus is to send the second-stage SCI to the second terminal apparatus may be implicitly indicated to the second terminal apparatus.

According to the method 400, the first terminal apparatus may indicate, to the second terminal apparatus without changing a structure of the first-stage SCI, whether the first terminal apparatus is to send the second-stage SCI. This does not cause signaling or indication resource overheads.

The technical solutions of this application are described in detail above. In a scenario in which the second-stage SCI is not required in the sidelink communication system, the transmit end apparatus (namely, the first terminal apparatus) in the sidelink communication may use the first-stage SCI, the scrambling information for the CRC corresponding to the first SCI, or the reference signal used for the channel estimation to decode the PSCCH carrying the first-stage SCI, to indicate, to the receive end apparatus (namely, the second terminal apparatus), whether the first terminal apparatus is to send the second-stage SCI, so that the 2-stage SCI and 1-stage SCI may be flexibly selected based on a specific scenario of the sidelink communication. In this way, resource waste caused by using the 2-stage SCI in any scenario of the sidelink communication may be avoided, and spectral efficiency of the sidelink communication system may also be improved.

The following lists several scenario examples in which the first terminal apparatus does not send the second-stage SCI to the second terminal apparatus in the sidelink communication. The technical solutions of this application are applicable to all the scenarios listed below.

Scenario Example 1

Sidelink Broadcast Data Transmission

In this scenario, all sidelink scheduling information used by the first terminal apparatus to schedule sidelink broadcast data may be indicated by the first-stage SCI, and the first terminal apparatus does not need to send the second-stage SCI to the second terminal apparatus.

Scenario Example 2

Configured Grant Mode in Mode 1

In this scenario, the transmit end apparatus sends a radio resource control (radio resource control, RRC) message to the receive end apparatus, where the RRC message carries a configured grant (configured grant), and information that needs to be indicated by the second-stage SCI may be carried in the configured grant. Therefore, the first terminal apparatus does not need to send the second-stage SCI to the second terminal apparatus.

Scenario Example 3

Mode in which a Terminal Apparatus Autonomously Selects a Resource in Mode 2

In this scenario, information that needs to be indicated by the second-stage SCI may be carried in a preconfigured sidelink grant (sidelink grant, SG) or a time frequency resource pattern (time frequency resource pattern, TFRP).

The preconfigured SG and the TFRP are known to both the transmit end apparatus and the receive end apparatus. Therefore, the receive end apparatus may determine, by sensing and measuring, an SG and a TFRP used by the transmit end apparatus. Therefore, the first terminal apparatus does not need to send the second-stage SCI to the second terminal apparatus.

It should be understood that the foregoing several scenarios are merely examples. There may be another scenario in which the 2-stage SCI solution does not need to be used in the sidelink communication and to which the solutions of this application are applicable.

The foregoing describes in detail the sidelink control information sending and receiving method provided in this application. The following describes a terminal apparatus provided in this application.

Figure 5:
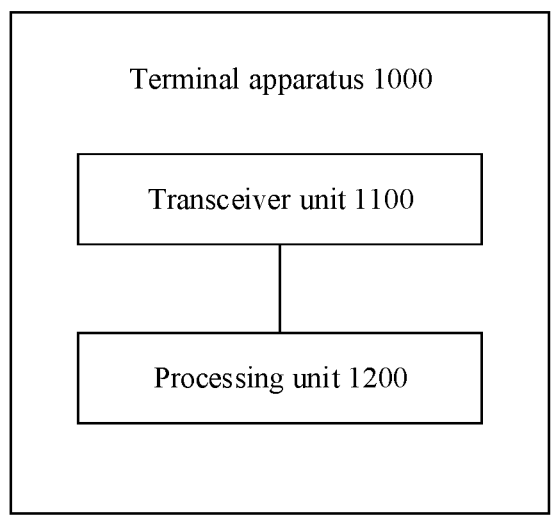
FIG. 5 is a schematic block diagram of a terminal apparatus 1000 according to this application.

FIG. 5 is a schematic block diagram of a terminal apparatus 1000 according to this application. As shown in FIG. 5, the terminal apparatus 1000 includes a transceiver unit 1100 and a processing unit 1200.

In an implementation, the terminal apparatus 1000 indicates, by using first indication information carried in first-stage SCI, whether the terminal apparatus 1000 is to send second-stage SCI to a second terminal apparatus. In this implementation, functions of the transceiver unit 1100 and the processing unit 1200 are as follows:

The transceiver unit 1100 is configured to send the first-stage sidelink control information SCI to the second terminal apparatus, where the first-stage SCI includes the first indication information, and the first indication information is used to indicate whether the terminal apparatus is to send the second-stage sidelink control information SCI to the second terminal apparatus.

The processing unit 1200 is configured to control, based on the first-stage SCI, the transceiver unit 1200 to send a PSSCH to the second terminal apparatus, where the first indication information indicates that the terminal apparatus is not to send the second-stage sidelink control information SCI to the second terminal apparatus.

Alternatively, the processing unit 1200 is configured to control, based on the first-stage SCI and the second-stage SCI, the transceiver unit 1200 to send a PSSCH to the second terminal apparatus, where the first indication information indicates that the terminal apparatus is not to send the second-stage sidelink control information SCI to the second terminal apparatus.

Optionally, the transceiver unit 1100 may alternatively be replaced with a sending unit or a receiving unit. For example, when performing a sending action, the transceiver unit 1100 may be replaced with the sending unit. When performing a receiving action, the transceiver unit 1100 may be replaced with the receiving unit.

Optionally, in an embodiment, that the first indication information is used to indicate whether the first terminal apparatus is to send the second-stage sidelink control information SCI to the second terminal apparatus includes:

The first-stage SCI includes an aggregation level AL field, where the AL field includes at least two valid values, and the at least two valid values include a first valid value, where the first valid value is 0, and 0 is used to indicate that the first terminal apparatus is not to send the second-stage SCI to the second terminal apparatus.

A valid value other than the first valid value in the at least two valid values is used to indicate that the first terminal apparatus is to send the second-stage SCI to the second terminal apparatus, where any one of the valid value other than the first valid value is specifically used to indicate an aggregation level of the second-stage SCI.

Optionally, in another embodiment, that the first indication information is used to indicate whether the first terminal apparatus is to send the second-stage sidelink control information SCI to the second terminal apparatus includes:

The first indication information includes at least two valid values, where a first valid value in the at least two valid values is used to indicate that the first terminal apparatus is not to send the second-stage SCI to the second terminal apparatus.

A second valid value in the at least two valid values is used to indicate that the first terminal apparatus is to send the second-stage SCI to the second terminal apparatus, and the first-stage SCI further includes an aggregation level AL field, where a valid value in the AL field is used to indicate an aggregation level of the second-stage SCI.

Optionally, in another embodiment, the first indication information indicates that the terminal apparatus is not to send the second-stage sidelink control information SCI to the second terminal apparatus, and the processing unit 1200 is configured to control, based on the first-stage SCI, the transceiver unit 1100 to send the PSSCH to the second terminal apparatus, where a mode of transmitting the PSSCH is broadcast.

In another implementation, the terminal apparatus 1000 indicates, by using scrambling information in first-stage SCI, whether the terminal apparatus 1000 is to send second-stage SCI to a second terminal apparatus. In this implementation, functions of the transceiver unit 1100 and the processing unit 1200 are as follows:

The transceiver unit 1100 is configured to send the first-stage SCI to the second terminal apparatus, where a cyclic redundancy check bit corresponding to the first SCI is scrambled by using the scrambling information, and the scrambling information includes a first identifier or a second identifier, where the first identifier is used to indicate that the first terminal apparatus is not to send the second-stage SCI to the second terminal apparatus, and the second identifier is used to indicate that the first terminal apparatus is to send the second-stage SCI to the second terminal apparatus.

The processing unit 1200 is configured to control, based on the first-stage SCI, the transceiver unit 1100 to send a physical sidelink shared channel PSSCH to the second terminal apparatus, where the scrambling information includes the first identifier.

Alternatively, the processing unit 1200 is configured to control, based on the first-stage SCI and the second-stage SCI, the transceiver unit 1100 to send a physical sidelink shared channel PSSCH to the second terminal apparatus, where the scrambling information includes the second identifier.

In still another implementation, the terminal apparatus 1000 indicates, by using a reference signal used to decode first-stage SCI, whether the terminal apparatus 1000 is to send second-stage SCI to a second terminal apparatus. In this implementation, functions of the transceiver unit 1100 and the processing unit 1200 are as follows:

The transceiver unit 1100 is configured to send the reference signal to the second terminal apparatus, where the reference signal includes a first reference signal or a second reference signal, where the first reference signal is used to indicate that the terminal apparatus is not to send the second-stage SCI to the second terminal apparatus, and the second reference signal is used to indicate that the terminal apparatus is to send the second-stage SCI to the second terminal apparatus.

The processing unit 1200 is configured to control, based on the first-stage SCI, the transceiver unit 1100 to send a physical sidelink shared channel PSSCH to the second terminal apparatus, where the reference signal includes the first reference signal.

Alternatively: the processing unit 1200 is configured to control, based on the first-stage SCI and the second-stage SCI, the transceiver unit 1100 to send a PSSCH to the second terminal apparatus, where the reference signal includes the second reference signal.

Optionally, in an embodiment, the reference signal may be a DMRS. The first reference signal may be a first DMRS, and the second reference signal may be a second DMRS.

Optionally, the terminal apparatus 1000 may be a transmit end device in sidelink communication, for example, a terminal device or a combined device or component that is in the terminal device and that may implement a function of the first terminal apparatus. The transceiver unit 1100 may be a transceiver. The transceiver may be replaced with a receiver or a transmitter. For example, when performing a sending action, the transceiver may be replaced with the transmitter. When performing a receiving action, the transceiver may be replaced with the receiver. The processing unit 1200 may be a processing apparatus or a processor.

Optionally, the terminal apparatus 1000 may be a circuit system installed in the transmit end device, for example, a chip or a system-on-a-chip (system on chip, SoC). In this implementation, the transceiver unit 1100 may be a communication interface. For example, the transceiver unit 1100 may be an input/output interface or an input/output circuit. The input/output interface may include an input interface and an output interface. The input/output circuit may include an input circuit and an output circuit. The processing unit 1200 may be a processing apparatus or a processor.

A function of the processing apparatus may be implemented by hardware, or may be implemented by hardware executing corresponding software. For example, the processing apparatus may include one or more memories and one or more processors, where the one or more memories are configured to store a computer program, and the one or more processors read and execute the computer program stored in the one or more memories, so that the terminal apparatus 1000 performs operations and/or processing performed by the first terminal apparatus in the method embodiments.

Optionally, the processing apparatus may include only the processor, and the memory configured to store the computer program is located outside the processing apparatus. The processor is connected to the memory by using a circuit/wire to read and execute the computer program stored in the memory.

Optionally, the transceiver unit 1100 may be a radio frequency apparatus, and the processing unit 1200 may be a baseband apparatus.

Figure 6:
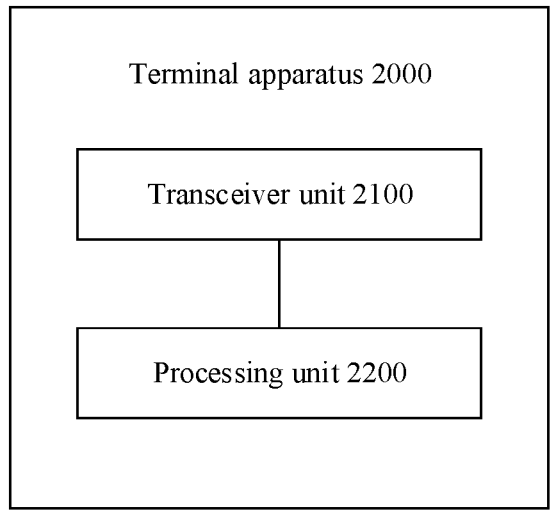
FIG. 6 is a schematic block diagram of a terminal apparatus 2000 according to this application.

FIG. 6 is a schematic block diagram of a terminal apparatus 2000 according to this application. As shown in FIG. 6, the terminal apparatus includes a transceiver unit 2100 and a processing unit 2200.

In an implementation, a transmit end apparatus (for example, the first terminal apparatus in this specification) in sidelink communication indicates, by using first indication information carried in first-stage SCI, whether the first terminal apparatus is to send second-stage SCI to a receive end apparatus in the sidelink communication. In this implementation, functions of the transceiver unit 2100 and the processing unit 2200 are as follows:

The transceiver unit 2100 is configured to receive the first-stage SCI from the first terminal apparatus, where the first-stage SCI includes the first indication information, and the first indication information is used to indicate whether the first terminal apparatus is to send the second-stage SCI to the terminal apparatus.

The processing unit 2200 is configured to control, based on the first-stage SCI, the transceiver unit 2100 to receive a PSSCH from the first terminal apparatus, where the first indication information indicates that the first terminal apparatus is not to send the second-stage SCI to the terminal apparatus.

Alternatively, the processing unit 2200 is configured to control, based on the first-stage SCI and the second-stage SCI, the transceiver unit 2100 to receive a PSSCH from the first terminal apparatus, where the first indication information indicates that the first terminal apparatus is to send the second-stage SCI to the second terminal apparatus.

Optionally, the transceiver unit 2100 may alternatively be replaced with a sending unit or a receiving unit. For example, when performing a sending action, the transceiver unit 2100 may be replaced with the sending unit. When performing a receiving action, the transceiver unit 2100 may be replaced with the receiving unit.

Optionally, in an embodiment, that the first indication information is used to indicate whether the first terminal apparatus is to send the second-stage sidelink control information SCI to the second terminal apparatus includes:

The first-stage SCI includes an aggregation level AL field, where the AL field includes at least two valid values, and the at least two valid values include a first valid value, where the first valid value is 0 and 0 is used to indicate that the first terminal apparatus is not to send the second-stage SCI to the second terminal apparatus.

A valid value other than the first valid value in the at least two valid values is used to indicate that the first terminal apparatus is to send the second-stage SCI to the second terminal apparatus, where any one of the valid value other than the first valid value is specifically used to indicate an aggregation level of the second-stage SCI.

Optionally, in another embodiment, that the first indication information is used to indicate whether the first terminal apparatus is to send the second-stage sidelink control information SCI to the second terminal apparatus includes:

The first indication information includes at least two valid values, where a first valid value in the at least two valid values is used to indicate that the first terminal apparatus is not to send the second-stage SCI to the second terminal apparatus.

A second valid value in the at least two valid values is used to indicate that the first terminal apparatus is to send the second-stage SCI to the second terminal apparatus, and the first-stage SCI further includes an aggregation level AL field, where a valid value in the AL field is used to indicate an aggregation level of the second-stage SCI.

In another implementation, a first terminal apparatus indicates, by using scrambling information in first-stage SCI, whether the first terminal apparatus is to send second-stage SCI to the terminal apparatus. In this implementation, functions of the transceiver unit 2100 and the processing unit 2200 of the terminal apparatus 2000 are as follows:

The transceiver unit 2100 is configured to receive the first-stage SCI from the first terminal apparatus, where a cyclic redundancy check bit corresponding to the first-stage SCI is scrambled by using the scrambling information, and the scrambling information includes a first identifier or a second identifier, where the first identifier is used to indicate that the first terminal apparatus is not to send the second-stage SCI to the second terminal apparatus, and the second identifier is used to indicate that the first terminal apparatus is to send the second-stage SCI to the second terminal apparatus.

The processing unit 2200 is configured to control, based on the first-stage SCI, the transceiver unit 2100 to receive a PSSCH from the first terminal apparatus, where the scrambling information includes the first identifier.

Alternatively, the processing unit 2200 is configured to control, based on the first-stage SCI and the second-stage SCI, the transceiver unit 2100 to receive a PSSCH from the first terminal apparatus, where the scrambling information includes the second identifier.

In still another implementation, a first terminal apparatus indicates, by using a reference signal used to decode first-stage SCI, whether the first terminal apparatus is to send second-stage SCI to the terminal apparatus. In this implementation, functions of the transceiver unit 1100 and the processing unit 1200 of the terminal apparatus 2000 are as follows:

The transceiver unit 2100 is configured to receive first-stage sidelink control information SCI from the first terminal apparatus.

The transceiver unit 2100 is further configured to detect reference information from the first terminal apparatus, where the reference signal includes a first reference signal or a second reference signal, where the first reference signal is used to indicate that the first terminal apparatus is not to send the second-stage SCI to the terminal apparatus, and the second reference signal is used to indicate that the first terminal apparatus is to send the second-stage SCI to the terminal apparatus.

The processing unit 2200 is configured to control, based on the first-stage SCI, the transceiver unit 2100 to receive a PSSCH from the first terminal apparatus, where the reference signal includes the first reference signal.

Alternatively, the processing unit 2200 is configured to control, based on the first-stage SCI and the second-stage SCI, the transceiver unit 2100 to receive a PSSCH from the first terminal apparatus, where the reference signal includes the second reference signal.

Optionally, the terminal apparatus 2000 may be a receive end device in sidelink communication, for example, a terminal device or a combined device or component that is in the terminal device and that may implement a function of the second terminal apparatus. The transceiver unit 2100 may be a transceiver. The transceiver may be replaced with a receiver or a transmitter. For example, when performing a sending action, the transceiver may be replaced with the transmitter. When performing a receiving action, the transceiver may be replaced with the receiver. The processing unit 2200 may be a processing apparatus or a processor.

In another implementation, the terminal apparatus 2000 may be a circuit system installed in the receive end device, for example, a chip or an integrated circuit. The transceiver unit 2100 may be a communication interface. For example, the transceiver unit 2100 may be an input/output interface or an input/output circuit. The input/output interface may include an input interface and an output interface. The input/output circuit may include an input circuit and an output circuit. The processing unit 2200 may be a processing apparatus.

A function of the processing apparatus may be implemented by hardware, or may be implemented by hardware executing corresponding software. For example, the processing apparatus may include one or more memories and one or more processors, where the one or more memories are configured to store a computer program, and the one or more processors read and execute the computer program stored in the one or more memories, so that the terminal apparatus 2000 performs operations and/or processing performed by the second terminal apparatus in the method embodiments.

Optionally, the processing apparatus may include only the processor, and the memory configured to store the computer program is located outside the processing apparatus. The processor is connected to the memory by using a circuit/wire to read and execute the computer program stored in the memory.

Optionally, the transceiver unit 2100 may be a radio frequency apparatus, and the processing unit 2200 may be a baseband apparatus.

Figure 7:
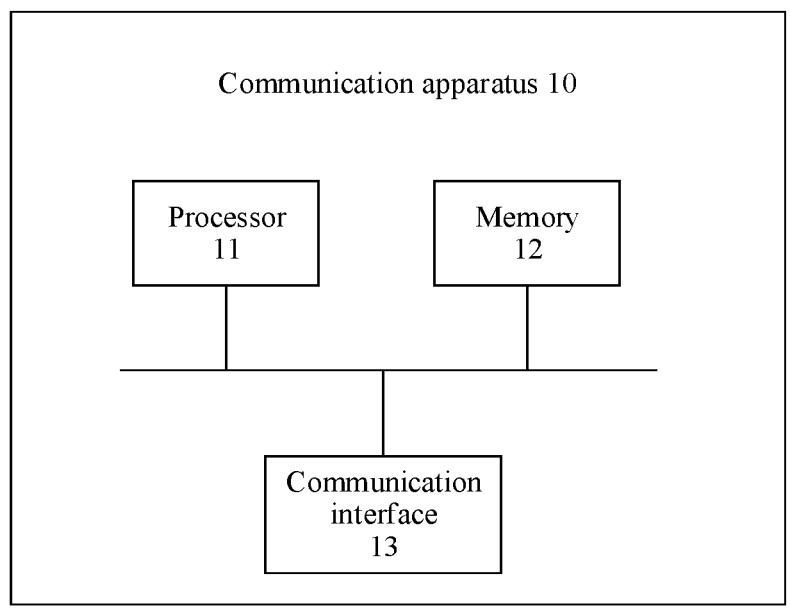
FIG. 7 is a schematic diagram of a structure of a terminal apparatus 10 according to this application.

FIG. 7 is a schematic diagram of a structure of a terminal apparatus 10 according to this application. As shown in FIG. 7, the terminal apparatus 10 includes one or more processors 11, one or more memories 12, and one or more communication interfaces 13. The processor 11 is configured to control the communication interface 13 to send and receive a signal, the memory 12 is configured to store a computer program, and the processor 11 is configured to invoke the computer program from the memory 12 and run the computer program, so that the terminal apparatus 10 performs processing and/or operations performed by the first terminal apparatus in the method embodiments of this application.

For example, the processor 11 may have a function of the processing unit 1200 shown in FIG. 5, and the communication interface 13 may have a function of the transceiver unit 1100 shown in FIG. 5. For details, refer to the descriptions in FIG. 5. Details are not described herein again.

Optionally, when the terminal apparatus 10 is a sidelink transmit end device, the processor 11 may be a baseband apparatus installed in the transmit end device, and the communication interface 13 may be a radio frequency apparatus.

Figure 8:
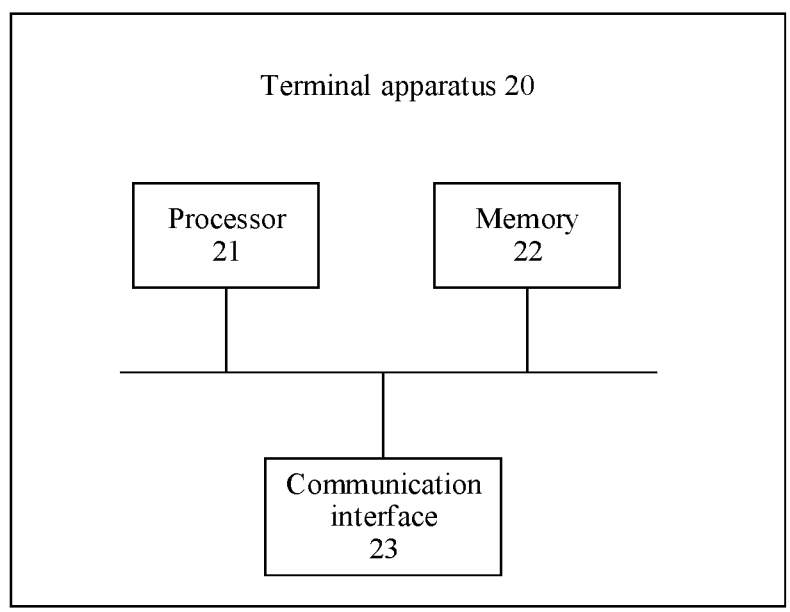
FIG. 8 is a schematic diagram of a structure of a terminal apparatus 20 according to this application.

FIG. 8 is a schematic diagram of a structure of a terminal apparatus 20 according to this application. As shown in FIG. 8, the terminal apparatus 20 includes one or more processors 21, one or more memories 22, and one or more communication interfaces 23. The processor 21 is configured to control the communication interface 23 to send and receive a signal, the memory 22 is configured to store a computer program, and the processor 21 is configured to invoke the computer program from the memory 22 and run the computer program, so that the terminal apparatus 20 performs processing and/or operations performed by the second terminal apparatus in the method embodiments of this application.

For example, the processor 21 may have a function of the processing unit 2200 shown in FIG. 6, and the communication interface 23 may have a function of the transceiver unit 2100 shown in FIG. 6. For details, refer to the descriptions in FIG. 6. Details are not described herein again.

Optionally, the memory and the memory in the foregoing apparatus embodiments may be physically independent units, or the memory and the processor may be integrated together.

In addition, this application further provides a computer-readable storage medium. The computer-readable storage medium stores computer instructions. When the computer instructions are executed on a computer, the computer is enabled to perform operations and/or processing performed by the first terminal apparatus in the sidelink control information sending method in this application.

This application further provides a computer-readable storage medium. The computer-readable storage medium stores computer instructions. When the computer instructions are executed on a computer, the computer is enabled to perform operations and/or processing performed by the second terminal apparatus in the sidelink control information sending method in this application.

This application further provides a computer program product. The computer program product includes computer program code. When the computer program code is executed on a computer, the computer is enabled to perform operations and/or processing performed by the first terminal apparatus in the sidelink control information sending method in this application.

This application further provides a computer program product. The computer program product includes computer program code. When the computer program code is executed on a computer, the computer is enabled to perform operations and/or processing performed by the second terminal apparatus in the sidelink control information sending method in this application.

This application further provides a terminal apparatus, including a processor and an interface circuit. The interface circuit is configured to receive computer code or instructions, and transmit the computer code or the instructions to the processor. The processor is configured to execute the computer code or the instructions, to perform operations and/or processing performed by the first terminal apparatus in the sidelink control information sending method in this application. This application further provides a terminal apparatus, including a processor and an interface circuit. The interface circuit is configured to receive computer code or instructions, and transmit the computer code or the instructions to the processor. The processor is configured to execute the computer code or the instructions, to perform operations and/or processing performed by the second terminal apparatus in the sidelink control information sending method in this application.

This application further provides a chip. The chip includes one or more processors. The one or more processors are configured to execute a computer program stored in a memory, to perform operations and/or processing performed by the first terminal apparatus in any method embodiment. The memory configured to store the computer program is disposed independently of the chip.

Further, the chip may further include one or more communication interfaces. The one or more communication interfaces may be an input/output interface, an input/output circuit, or the like. Further, the chip may alternatively include one or more memories.

This application further provides a chip. The chip includes one or more processors. The one or more processors are configured to execute a computer program stored in a memory, to perform operations and/or processing performed by the second terminal apparatus in any method embodiment. The memory configured to store the computer program is disposed independently of the chip.

The chip may further include one or more communication interfaces. The one or more communication interfaces may be an input/output interface, an input/output circuit, or the like. The chip may further include one or more memories.

In addition, this application further provides a sidelink communication system, including the first terminal apparatus and/or the second terminal apparatus in embodiments of this application.

Further, the sidelink communication system may further include an access network device and/or a core network device.

The processor in embodiments of this application may be an integrated circuit chip, and has a signal processing capability. In an implementation process, steps in the foregoing method embodiments may be implemented by using an integrated logic circuit of hardware in the processor or by using instructions in a form of software. The processor may be a general-purpose processor, a digital signal processor (digital signal processor. DSP), an application-specific integrated circuit (application-specific integrated circuit. ASIC), a field programmable gate array (field programmable gate array. FPGA), another programmable logic device, a discrete gate, a transistor logic device, or a discrete hardware component. The general-purpose processor may be a microprocessor, or the processor may be any conventional processor or the like. The steps of the methods disclosed in embodiments of this application may be directly executed and completed by using a hardware encoding processor, or may be executed and completed by using a combination of hardware and software modules in the encoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing method in combination with hardware of the processor.

The memory in embodiments of this application may be a volatile memory or a non-volatile memory, or may include a volatile memory and a non-volatile memory. The non-volatile memory may be a read-only memory (read-only memory. ROM), a programmable read-only memory (programmable ROM. PROM), an erasable programmable read-only memory (erasable PROM. EPROM), an electrically erasable programmable read-only memory (electrically EPROM. EEPROM), or a flash memory. The volatile memory may be a random access memory (random access memory. RAM) that is used as an external cache. Through examples but not limitative descriptions. RAMs in many forms are available, for example, a static random access memory (static RAM. SRAM), a dynamic random access memory (dynamic RAM. DRAM), a synchronous dynamic random access memory (synchronous DRAM. SDRAM), a double data rate synchronous dynamic random access memory (double data rate SDRAM. DDR SDRAM), an enhanced synchronous dynamic random access memory (enhanced SDRAM. ESDRAM), a synchlink dynamic random access memory (synchlink DRAM. SLDRAM), and a direct rambus random access memory (direct rambus RAM. DRRAM). It should be noted that the memory in the system and method described in this specification includes but is not limited to these and any memory of another appropriate type.

The terms such as "unit" and "system" used in this specification are used to indicate computer-related entities, hardware, firmware, combinations of hardware and software, software, or software being executed. For example, the component may be but is not limited to a process that runs on a processor, a processor, an object, an executable file, an execution thread, a program, and/or a computer. As illustrated by using figures, both a computing device and an application that runs on the computing device may be components. One or more components may reside in the process and/or the execution thread. The components may be located in one computer and/or distributed between two or more computers. In addition, these components may be executed by various computer-readable media that store various data structures. The components may communicate by using a local and/or remote process based on a signal having one or more data packets (for example, data from two components interacting with another component in a local system, a distributed system, and/or a network such as the internet interacting with another system by using the signal).

A person of ordinary skill in the art may be aware that, units and algorithm steps in examples described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief descriptions, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in an electrical, a mechanical, or another form.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for indicating a computer device (which may be a personal computer, a server, or a network device) to perform all or a part of the steps of the methods described in embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application. Variation or replacement readily figured out by a person skilled in the art within the technical scope disclosed in this application shall fall within the protection scope of this application. The protection scope of this application shall be subject to the protection scope of the claims.

What is claimed is:

1. A sidelink control information sending method, comprising:
    sending, by a first terminal apparatus, first-stage sidelink control information (SCI) to a second terminal apparatus, wherein the first-stage SCI comprises first indication information, and the first indication information is used to indicate whether the first terminal apparatus is to send second-stage SCI to the second terminal apparatus; and
    based on the first indication information indicating that the first terminal apparatus is not to send the second-stage SCI to the second terminal apparatus, sending, by the first terminal apparatus, a physical sidelink shared channel (PSSCH) to the second terminal apparatus based on the first-stage SCI: or
    based on the first indication information indicating that the first terminal apparatus is to send the second-stage SCI to the second terminal apparatus, sending, by the first terminal apparatus, the PSSCH to the second terminal apparatus based on the first-stage SCI and the second-stage SCI; and
    wherein that the first indication information is used to indicate whether the first terminal apparatus is to send the second-stage SCI to the second terminal apparatus comprises:
    wherein the first-stage SCI comprises an aggregation level (AL) field, wherein the AL field comprises at least two valid values, and the at least two valid values comprise a first valid value, wherein the first valid value is 0, and 0 is used to indicate that the first terminal apparatus is not to send the second-stage SCI to the second terminal apparatus; and
    wherein a valid value other than the first valid value in the at least two valid values is used to indicate that the first terminal apparatus is to send the second-stage SCI to the second terminal apparatus, wherein any one of the valid value other than the first valid value is specifically used to indicate an aggregation level of the second-stage SCI.

2. The method according to claim 1, wherein based on the first indication information indicating that the first terminal apparatus is not to send the second-stage SCI to the second terminal apparatus, the first terminal apparatus sends the PSSCH to the second terminal apparatus based on the first-stage SCI, wherein a mode of transmitting the PSSCH is broadcast.

3. A sidelink control information sending method, comprising:
    sending, by a first terminal apparatus, first-stage sidelink control information (SCI) to a second terminal apparatus, wherein the first-stage SCI comprises first indication information, and the first indication information is used to indicate whether the first terminal apparatus is to send second-stage SCI to the second terminal apparatus; and
    based on the first indication information indicating that the first terminal apparatus is not to send the second-stage SCI to the second terminal apparatus, sending, by the first terminal apparatus, a physical sidelink shared channel (PSSCH) to the second terminal apparatus based on the first-stage SCI; or
    based on the first indication information indicating that the first terminal apparatus is to send the second-stage SCI to the second terminal apparatus, sending, by the first terminal apparatus, the PSSCH to the second terminal apparatus based on the first-stage SCI and the second-stage SCI; and
    wherein that the first indication information is used to indicate whether the first terminal apparatus is to send the second-stage SCI to the second terminal apparatus comprises:
    wherein the first indication information comprises at least two valid values, wherein a first valid value in the at least two valid values is used to indicate that the first terminal apparatus is not to send the second-stage SCI to the second terminal apparatus; and
    wherein a second valid value in the at least two valid values is used to indicate that the first terminal apparatus is to send the second-stage SCI to the second terminal apparatus, and the first-stage SCI further comprises an aggregation level (AL) field, wherein a valid value in the AL field is used to indicate an aggregation level of the second-stage SCI.

4. A sidelink control information sending method, comprising:
    sending, by a first terminal apparatus, first-stage sidelink control information (SCI) to a second terminal apparatus, wherein a cyclic redundancy check bit corresponding to the first SCI is scrambled by using scrambling information, and the scrambling information comprises a first identifier or a second identifier, wherein the first identifier is used to indicate that the first terminal apparatus is not to send second-stage SCI to the second terminal apparatus, and the second identifier is used to indicate that the first terminal apparatus is to send the second-stage SCI to the second terminal apparatus; and
    based on the scrambling information comprising the first identifier, sending, by the first terminal apparatus, a physical sidelink shared channel (PSSCH) to the second terminal apparatus based on the first-stage SCI; or
    based on the scrambling information comprising the second identifier, sending, by the first terminal apparatus, the PSSCH to the second terminal apparatus based on the first-stage SCI and the second-stage SCI.

5. The method according to claim 4, wherein the scrambling information comprises the first identifier, and the first terminal apparatus sends the PSSCH to the second terminal apparatus based on the first-stage SCI, wherein a mode of transmitting the PSSCH is broadcast.

* * * * *

UNITED STATES PATENT AND TRADEMARK OFFICE
CERTIFICATE OF CORRECTION

| | |
|---|---|
| PATENT NO. | : 12,289,724 B2 |
| APPLICATION NO. | : 17/707701 |
| DATED | : April 29, 2025 |
| INVENTOR(S) | : Su et al. |

Page 1 of 1

It is certified that error appears in the above-identified patent and that said Letters Patent is hereby corrected as shown below:

In the Claims

Claim 1: Column 31, Line 46: "based on the first-stage SCI: or" should read as -- based on the first-stage SCI; or --.

Signed and Sealed this
Fourteenth Day of October, 2025

John A. Squires
*Director of the United States Patent and Trademark Office*